May 5, 1925.  1,536,227

A. H. LEIPERT

STEERING WHEEL

Filed Dec. 8, 1923

Patented May 5, 1925.

1,536,227

UNITED STATES PATENT OFFICE.

AUGUST H. LEIPERT, OF NEW YORK. N. Y., ASSIGNOR TO INTERNATIONAL MOTOR COMPANY, OF NEW YORK, N. Y., A CORPORATION OF DELAWARE.

STEERING WHEEL.

Application filed December 8, 1923. Serial No. 679,287.

*To all whom it may concern:*

Be it known that I, AUGUST H. LEIPERT, a citizen of the United States, residing in College Point, the borough of Queens of the city of New York, in the State of New York, have invented certain new and useful Improvements in Steering Wheels, of which the following is a specification, reference being had to the accompanying drawing, forming a part hereof.

The automobile art has long recognized the fatiguing effect of vibrations transmitted through the steering wheel to the hands of the driver of a motor vehicle and many attempts have been made to absorb these vibrations and yet provide an annulus or rim which would both satisfy manufacturing requirements and meet the strains of every day use. For instance, in U. S. Patents Nos. 702,381 and 1,262,194 pneumatic steering wheels are proposed. Such wheels are not practical and do not serve the primary purpose of relieving fatigue. From a manufacturing standpoint they are very expensive and difficult to make and in use they have a tendency to distortion and puncture or derangement of the valve. But above all other considerations they require inflation for practical service to a point where they are very rigid and do not relieve the hands of the driver from the vibrations transmitted thereto. In Patent No. 1,361,272 it is proposed to overcome the objections to pneumatic wheels by providing a flexible core on which the rubber might be molded. This type of wheel while satisfying many conditions does not offer the degree of compressibility and pliability which are highly desirable if the greatest relief to the hands is to be afforded through the use of rubber. Such rims have the further objection that they are very cold to the hands. In Patent No. 1,430,732 there is disclosed a construction providing for compressibility and flexibility in the rim of a steering wheel but the patented construction permits such compressibility and flexibility as to approach distortion and is of such a complicated nature as to be impracticable from the considerations of manufacture and use. In the patent it is proposed to provide the rim with a rigid core and compressibility and flexibility are afforded through the provision of a coil spring surrounding the rigid core and having an envelope of fabric which is encased in rubber to form the hand grip.

In accordance with the present invention it is proposed to go a step further in the development of the art and provide a steering wheel which shall be simple and inexpensive to manufacture, durable in use, and compressible and pliable to the highest possible degree consistent with transmission of the steering stresses to the spider. Accordingly the annulus is formed by embedding, as a core in a mass of rubber, a length of flexible metallic tubing which may be similar to that found in the helically wound metal hose commonly used as a conduit for electric wiring. Such tubing is particularly suitable as the core of a steering rim since it provides the desired degree of compressibility and flexibility and at the same time gives sufficient strength to the rim to effectively transmit driving stresses to the spider. It is also readily obtainable at a low cost which is a factor in large scale commercial production. Furthermore its structure renders the core impervious to the rubber during molding and lends itself readily to the formation of a joint between the two ends of a length of tubing in the manufacture of the rim. The completed rim in use has been found to have proper insulating properties and conform pleasantly to the grasp and not to offer the cold unyielding grip to be found in rims which are necessarily of a more rigid construction.

One suitable embodiment of the invention, as stated above, is illustrated in the drawings wherein.

Figure 1:
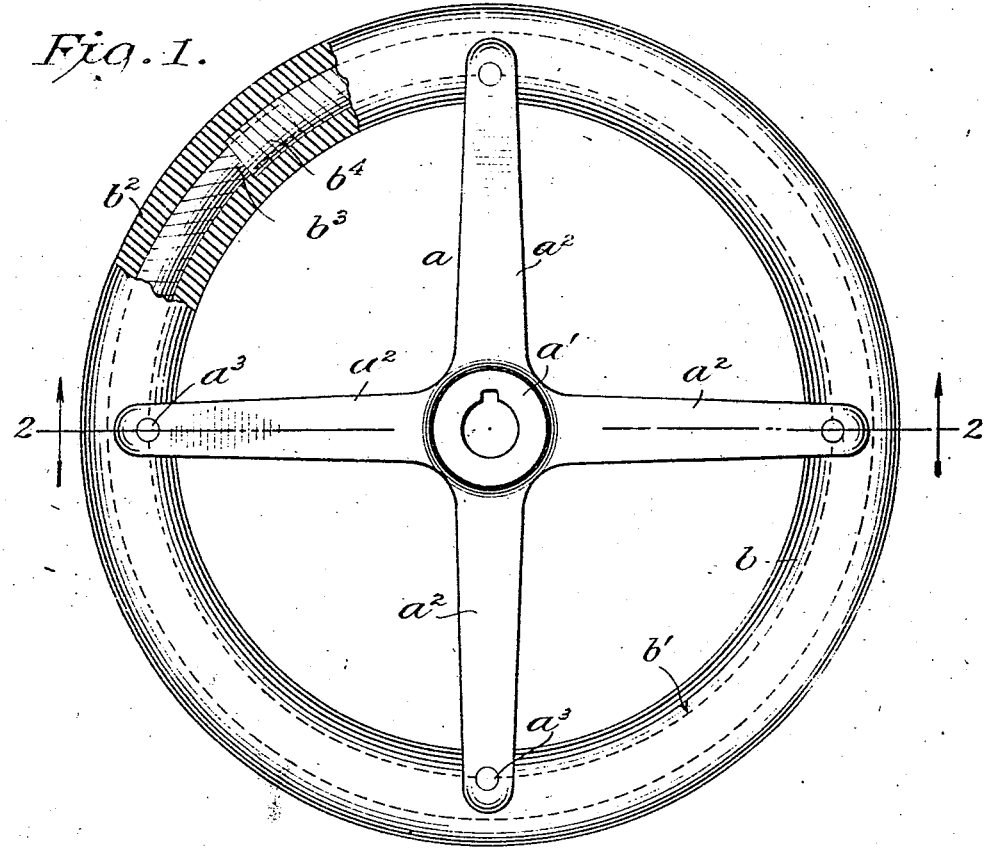
Figure 1 is a view in plan and partly in section showing the improved rim mounted on the spider of a steering wheel.
Figure 2:
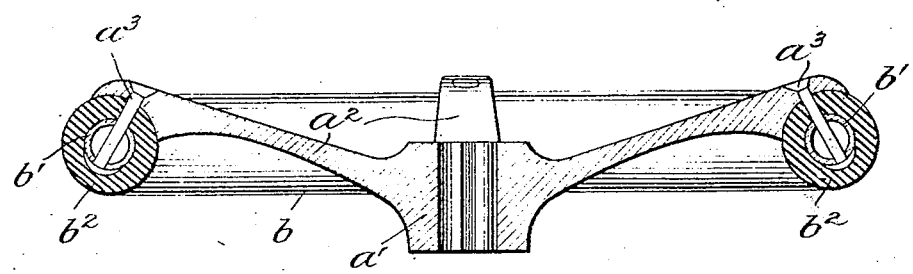
Figure 2 is a view in transverse section through the rim.

In the particular example illustrated the steering wheel embodies the usual spider $a$ formed with the hub $a'$ to receive and be fixed to the steering post and radial arms $a^2$ to which the rim or annulus indicated in general at $b$ is attached. The rim $b$ is made up of a yielding and flexible hollow metallic core $b'$ directly attached to the arms $a^2$ of the spider and encased or embedded in a mass of rubber $b^2$ molded to the desired shape. It has been found that the flexible metallic hose, such as is used for conduits for electric wiring and the like, is particularly applicable as the core of a steering rim. Such hose is generally formed of a metal ribbon wound in helical form. Its construction permits the requisite degree of pliability and at the same time affords sufficient strength and rigidity to permit its attachment to the arms of the spider. It is readily bent to shape and its construction facilitates the connection of the proximate ends to form a closed circle. In constructing the steering rim a length of flexible hose slightly longer than the circumference of the axis of the rim is bent in the form of a circle with the free ends telescoped. One of the ends as at $b^3$ is drawn out and twisted somewhat more tightly so that its diameter is slightly less than normal and the proximate end, as at $b^4$ is untwisted somewhat so that the internal diameter of the core is slightly larger than normal and sufficient to receive the extended end $b^3$. The end $b^3$ is then inserted in the end $b^4$. The two ends will tend to resume their normal size due to the natural elasticity of the metallic ribbon and the end $b^4$ contracting about the end $b^3$ (which has a tendency to expand) will form a joint secure enough for the purpose in hand. The annulus thus formed is secured to the arms $a^2$ as by rivets $a^3$, for instance.

It will thus be seen that an extremely simple rim has been provided which will be compressible and flexible to the desired degree without any tendency toward distortion and which at the same time is extremely simple of manufacture and inexpensive.

The invention is not to be limited to the precise manner of manufacture described nor to the particular instrumentality illustrated as the core since it will be obvious that other means of attaining the same result will suggest themselves to those skilled in the art and no limitation is intended except as indicated in the appended claims.

What I claim is:

1. In a rim for steering wheels, an annular flexible core formed of a length of helically wound metallic hose and a mass of vulcanized rubber in which said core is embedded.

2. In a rim for steering wheels, an annular flexible core formed of a length of helically wound metallic hose having the ends thereof telescoped to form a joint and a mass of vulcanized rubber in which the core is embedded.

3. A steering wheel including a spider having arms, a flexible hollow tubular core comprising a metallic hose and formed of helically wound metallic ribbon, a mass of rubber in which the core is embedded and means to secure the core to the arms of the spider.

4. A method of making an annulus for steering wheels comprising reducing the diameter of one end of a length of flexible metallic hose and increasing the interior diameter of the other end thereof, bending said length of hose in the form of a circle and forming the joint between the ends by inserting the reduced end in the end of increased diameter, securing the core thus formed to the arms of the spider and embedding said core in a mass of yielding non-metallic material molded to shape.

This specification signed this 4th day of December, A. D. 1923.

AUGUST H. LEIPERT.